Feb. 19, 1946.  F. W. SCHWINN  2,395,346
SUSPENSION SADDLE
Filed Aug. 14, 1943    2 Sheets-Sheet 1
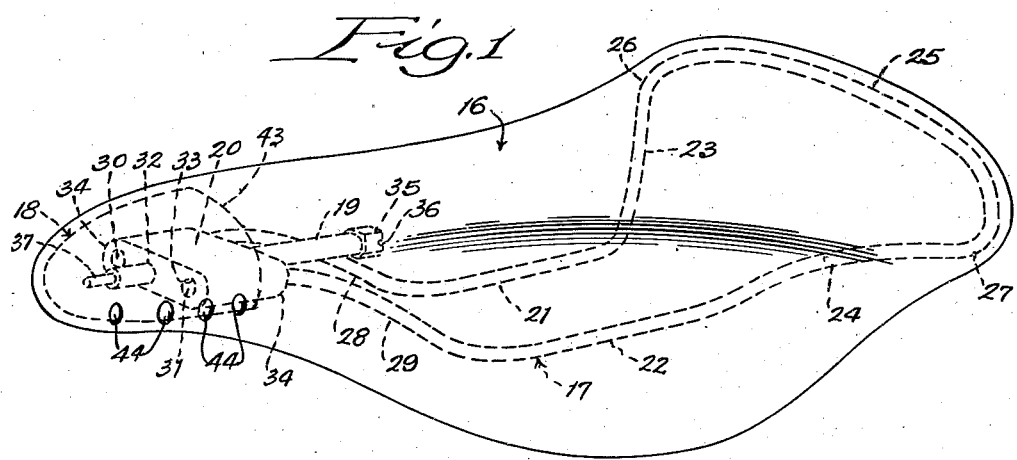
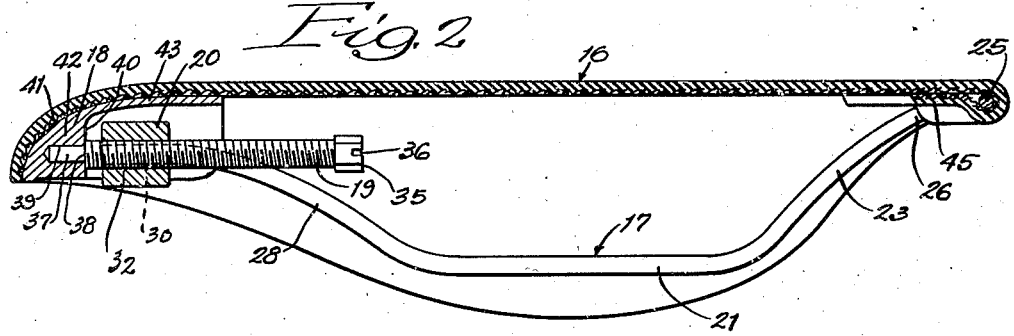
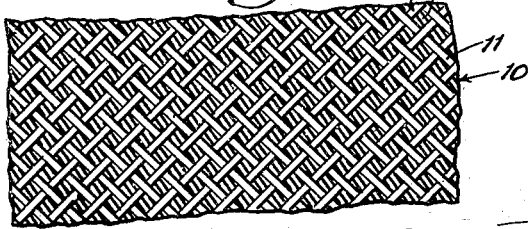

Feb. 19, 1946. F. W. SCHWINN 2,395,346
SUSPENSION SADDLE
Filed Aug. 14, 1943 2 Sheets-Sheet 2
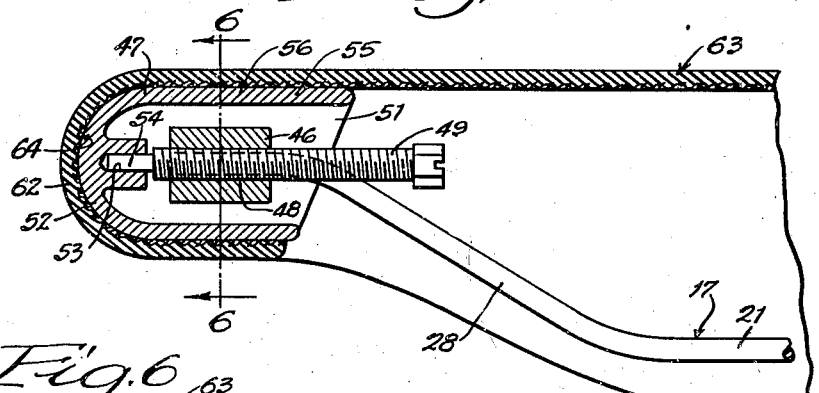
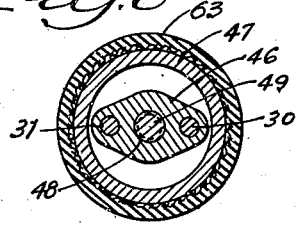
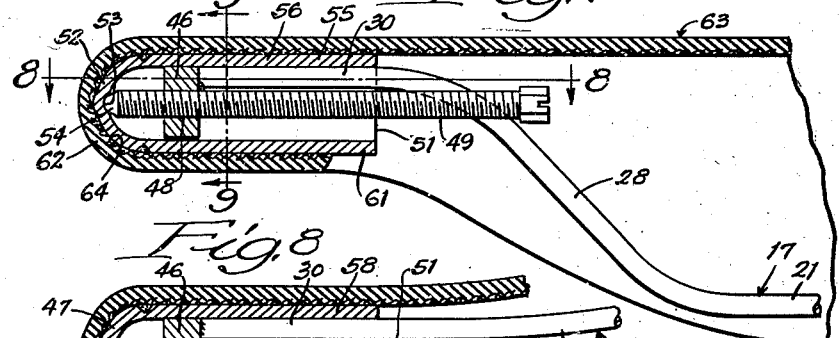
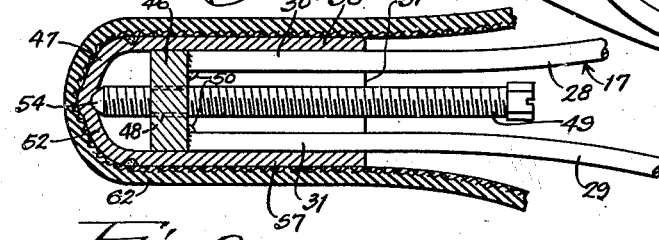
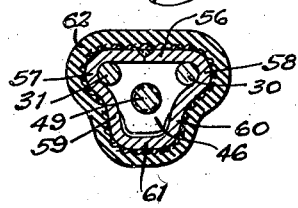
Inventor:
Frank W. Schwinn,
By McCaleb, Hendricks & Dickinson
Attorneys.

Patented Feb. 19, 1946

2,395,346

UNITED STATES PATENT OFFICE 2,395,346

SUSPENSION SADDLE

Frank W. Schwinn, Chicago, Ill.

Application August 14, 1943, Serial No. 498,682

6 Claims. (Cl. 155—5.23)

The present invention relates to suspension saddles and is particularly concerned with the provision of an improved suspension saddle for bicycles adapted to eliminate the usual uncomfortable "breaking-in" period which is required by the suspension saddles of the prior art.

The suspension saddles of the prior art are usually provided with saddle tops made of cowhide and when new are hard and uncomfortable and the breaking in of a new saddle involves a considerable amount of discomfort. After considerable use, such leather saddle tops of the prior art soften and gradually conform to the anatomy of the rider, but the softening of the leather saddle top also involves its stretching and the additional length of the leather top would have to be taken up by means of adjustable devices for increasing the length of the saddle frame.

With the leather saddle tops of the prior art, however, the completion of the "breaking-in" period did not mean that stretching of the top was finished as the leather top would continue to stretch so much that no further adjustments could be made and it would be necessary to mount a new top on the frame and repeat the process of breaking in the saddle top.

One of the objects of the invention is the provision of an improved suspension saddle and a suspension saddle top which do not have the above-mentioned disadvantages of the devices of the prior art and which are characterized by the following advantages:

(1) A suspension saddle top which does not need to be broken in in order to be comfortable.

(2) A suspension saddle top which is sufficiently soft and which conforms sufficiently to the anatomy of the user so that maximum comfort is provided from the beginning of the use of the saddle top as distinguished from the devices of the prior art which, even though broken in, were still too stiff for maximum comfort.

(3) A suspension saddle top which does not develop sag and which does not stretch beyond a minimum amount so that the saddle top may always be kept under proper tension with the takeup devices that form a part of the invention.

(4) A suspension saddle top which does not have to be kept under as much tension as the devices of the prior art so that it has the required flexibility to give and to relieve the shocks of road unevenness, bumps, etc.

(5) A suspension saddle top which does not stretch so much that it eventually requires replacement solely on account of its increased length or size.

Another object of the invention is the provision of an improved suspension saddle top and a suspension saddle frame which is provided with a more durable and efficient mode of supporting the saddle top on the frame so that the strain is not concentrated on a few rivets as is the case in the devices of the prior art.

Another object of the invention is the provision of an improved adjustable nose piece structure which is adapted to eliminate the twisting and tipping up of the nose of the saddle, which was inherent in the devices of the prior art, and to permit of a greater range of adjustment.

Other objects and advantages of the invention will be apparent from the following description and the accompanying drawings in which similar characters of reference indicate similar parts throughout the several views.

Referring to the drawings, of which there are two sheets,

Figure 1 is a view in perspective of a suspension saddle constructed according to the invention, with the suspension saddle frame shown in dotted lines;

Fig. 2 is a vertical cross-sectional view taken on a plane passing through the axis of the suspension saddle;

Fig. 3 is a fragmentary enlarged sectional view showing the details of structure of the material of which the suspension saddle top is made;

Fig. 4 is a fragmentary sectional view of a part of the suspension saddle top showing the fabric and the direction of the weft and warp threads with relation to the major axis or length of the suspension saddle top;

Fig. 5 is a fragmentary sectional view similar to Fig. 2 of a modification showing the structure of a modified form of saddle nose and suspension saddle top for cooperating with it;

Fig. 6 is a vertical sectional view taken on the plane of the line 6—6 of Fig. 5, looking in the direction of the arrows;

Fig. 7 is a view similar to Fig. 5, of another modification;

Fig. 8 is a fragmentary horizontal sectional view taken on the plane of the line 8—8 of Fig. 7, looking in the direction of the arrows; and Fig. 9 is a vertical sectional view taken on the plane of the line 9—9 of Fig. 7 looking in the direction of the arrows.

The present saddle tops are preferably not made of leather but are constructed of a fabricated material the details of which are shown in Figs. 3 and 4. The basis of this fabricated material consists of a woven web indicated in its entirety by the numeral 10 (Fig. 4) and having two sets of woven cords either one of which may be the weft or the warp.

In Fig. 4 the cords which extend diagonally upward toward the left and downward toward the right, have been designated by the numeral 11 as warp threads, and those which extend diagonally up toward the right as the weft threads 12. As the weave of this cord fabric is symmetrical, it is immaterial which of the cords are the weft threads or the warp threads.

The cords 11 and 12 may extend at substantially right angles to each other and they are loosely woven together with spaces 13 between them in order to give the fabric the characteristics further to be described. This loosely woven fabric of cords is then impregnated with rubber and cured or vulcanized in a mold to the required shape and with a predetermined amount of rubber content to give it the proper characteristics.

In cutting and molding the loosely woven fabric for a saddle top, the threads or cords are all arranged at substantially an angle of 45° to a line which is drawn from the nose of the saddle to the center of the back. The location of the threads or cords of the fabric in this direction will permit the saddle top to stretch on account of the inherent characteristic of such fabrics to stretch in a direction which is at an angle of 45° to the threads or cords. Such a fabric will not stretch in the direction of the cords except a small amount due to the direct elongation of the cords. I have discovered that such a fabric will stretch in a diagonal direction in a manner which is roughly in accordance with the density of the weave, as a tightly woven fabric will stretch less and a loosely woven fabric will stretch more.

The cords of this fabric being embedded in rubber and cured to the proper consistency, the rubber will not only impede the stretching and control the amount of stretch, but it will also cause the fabric to tend to return to its normal shape and position when the stretching strain is removed. The rubber will also definitely limit the extent to which the fabric will stretch under any given load and it will decrease the rate of stretch progressively as the load is increased. This latter characteristic is very important in a saddle top because it is desirable for the transmitted shock to be broken gradually when the rider hits a bump in the road.

By varying the density of the weave, the amount of flexibility can be changed and by varying the characteristics of the rubber compound and the cure, the flexibility can also be varied, but both of these variable factors are preferably so predetermined that the saddle top has both the required flexibility for conforming immediately to the anatomy of the rider and the capability of stretching sufficiently and returning to initial size or shape so that it remains under proper tension at all times but gives or stretches sufficiently to relieve the shock when an obstruction is encountered in riding.

The shape and size of saddle tops constructed according to the invention are subject to infinite variations but the foregoing characteristics may be brought about in the saddle top so long as the fabric is loosely woven and embedded in rubber or other similar material and the cords of the fabric extend diagonally to the fore and aft center line of the saddle top.

Since even such a saddle top must be provided with a supporting frame, there will remain certain stress lines which are created by the stretch under different loadings and directions of loading in the natural shifting of the body incidental to riding on uneven surfaces, turning corners, etc., and therefore the fabric base described above also preferably includes a pre-molded sponge or fluff rubber layer 14 which is interposed between the saddle top base indicated at 10, and the finish cover 15, which preferably consists of soft pliable and smooth rubber or other similar material.

This layer of sponge or fluff rubber 14 will protect the rider from the slight stress ridges that might otherwise be present in the saddle base as the fluff rubber gives the saddle top a thicker body which tends to prevent the formation of stress ridges, and it also interposes a soft pad between the tightly stressed fabric base and the rider.

By means of the sponge or fluff rubber layer, the saddle top may be made sufficiently soft so that it will permit even the new or unaccustomed rider to ride for a considerable length of time without any discomfort. As the layer of sponge or fluff rubber has no appreciable tensile strength, it will not appreciably affect the flexibility of the fabric top nor will this characteristic be affected by the thin layer of rubber 15 used as a finish layer.

The improved saddle top which is indicated in its entirety by the numeral 16, being molded to predetermined shape and having a loosely woven fabric base with its cords or weft and warp threads extending diagonally with respect to the line of tension from the front to the back of the saddle top, it will not have the stiffness which is present in the leather saddle tops of the prior art that are also molded to predetermined shape because the saddle tops constructed according to the invention are not necessarily made stiff to retain their shape as are the leather saddle tops of the prior art.

In some embodiments of the invention the details of the fastening of the saddle top to the spring wire frame may conform to the existing practices of the prior art, but the present saddle top is preferably used in connection with an improved suspension saddle frame and it is preferably secured to the saddle frame in an improved manner as shown in the other figures.

Referring to Figs. 1 and 2, 17 indicates in its entirety the saddle top frame which may be constructed of a resilient steel spring wire provided with a saddle frame nose 18 adjustably mounted upon a threaded member 19 carried by the end frame member 20. The wire frame 17 preferably has the parallel horizontally extending portions 21, 22 suitably spaced for securement to the usual fixtures which mount the suspension frame on the saddle post mast.

From the parallel portions 21, 22 the wire frame 17 extends diagonally outward and upward, these diagonal portions being indicated by the numerals 23, 24 and they are integrally joined to a rear frame portion 25 which is located substantially in the plane of the top of the saddle and which is curved to correspond substantially to the curvature of the rear edge of the saddle top 16. This rear frame portion 25 is joined to the diagonal downwardly and inwardly extending portions 23, 24 at each end by an integral portion having an easy bend at 26, 27.

At its forward end, the wire frame 17 may have a pair of diagonally upwardly extending portions 28, 29, terminating in a pair of parallel end portions 30, 31 which may be fixedly secured to an end frame member 20 which is provided with a threaded bore 32 for receiving the screw bolt 19. The parallel end portions 30, 31 of the wire frame 17 may be secured in the bores 33 in the end frame member 20 by a tight frictional fit and by brazing, welding, or soldering, or other suitable securing devices.

The end frame member 20 may consist of a block of metal which is substantially rectangular in plan and provided with rounded lateral edges 34. The bore 32 for receiving the screw bolt 19 is axially and centrally located in the block 20. Screw bolt 19 is provided with any desirable type of head such as the head 35 having a screw driver slot 36 and at its opposite end it may be provided with a reduced cylindrical portion 37 and an annular thrust shoulder 38.

The reduced cylindrical portion 37 has a rotating fit in a cylindrical bore 39 in the nose piece 18. The rearwardly disposed thrust surface 40 on the nose piece engages the annular thrust surface 38 on the screw bolt 19.

The nose piece 18 may consist of a cast metal member which is formed with an upper and forward curved surface 41 that conforms to the desired shape of the saddle nose. This curved surface is formed upon a solid body portion 42 which has the bore 39 and also upon a rearwardly extending skirt 43 which is located not only at the top but at both sides of the nose piece 18.

The saddle top 16 is molded and shaped to fit on the nose piece 18 conforming to the curved surface 41 on the body 42 and skirt 43 and covering these parts and in some embodiments of the invention the saddle top may be secured to the nose piece 18 by a plurality of rivets 44 having smooth external heads and having bodies which pass through the saddle top adjacent its edge and through the skirt 43 of the nose piece 18.

At its rear end the saddle top 16 may be secured to the wire frame 17 by wrapping the fabricated structure of which the saddle top is made at this edge about the wire portion 25 before vulcanizing and providing a lower folded portion 45 which engages the under side of the saddle top 16 and is vulcanized to it. At this end the wire frame may be secured to the saddle top by vulcanizing the entire assembly, including the spring wire in the same mold and thus permanently attaching the saddle top to its wire frame.

The operation of the suspension saddle and saddle top constructed according to the invention is as follows:

The length of the frame 17 relative to the saddle top 16 is such that when the nose end of the saddle top is secured to the nose piece 18 with the nose piece fully retracted, a predetermined amount of tension may be placed upon the saddle top by means of the threaded member 19. When this screw bolt is rotated in a clockwise direction, it progresses toward the left in the block 20 and urges the nose piece 18 toward the left to tension the saddle top 16. This produces a predetermined amount of bow or bending in the wire frame 17 which places the wire frame under tension. The characteristics of tension of the wire frame are predetermined with respect to the characteristics of the saddle top so that the saddle top will be under such tension as is desirable for the best riding characteristics.

Such a saddle top will immediately return to its former and normal shape when stretching strains are relieved. Yet it is also adapted to give to conform to the anatomy of the rider sufficiently at its first use so that there is no uncomfortable "breaking-in" period.

Furthermore, the tensile strength of the assembly of the saddle top is such that it does not continue to stretch and it is not necessary to continue to take up sag by means of adjustment of the nose piece and consequently the saddle tops constructed according to the invention may be used for a longer period of time and do not have to be discarded on account of excessive stretching as occurs with the devices of the prior art that become too large for their supporting frames.

Referring to Figs. 5 to 9, the present saddle top construction also lends itself to use with an improved form of securement to the improved saddle nose shown in these figures. In this embodiment the construction of the rear portion of the saddle frame may be sustantially the same as previously described.

The two end portions 30, 31 of the wire frame 17 may be secured to a sliding threaded member 46 which may be rectangular in plan but the elevational shape thereof may conform substantially to the internal shape of a nose member 47. This threaded member 46 also has a threaded bore 48 for receiving the screw bolt 49 and the wires 30, 31 may be brazed or otherwise secured to threaded member 46 at 50.

The nose piece 47 in this case may consist of a cast metal or sheet metal member which is substantially tubular in shape, the rear end being open at 51, and the other end being closed by a curved end portion 52 which is provided on its inner side with a depression 53 for receiving the partially spherical end portion 54 on screw bolt 49.

The tubular portion 55 of nose piece 47 may take the cross-sectional shape shown in Fig. 9 having a substantially flat upper portion 56 integrally joined to downwardly extending partially cylindrical portions 57, 58 which curve about the wire portions 30, 31 and serve as guides for the sliding motion of the nose piece 47 on the wire frame 17.

The lower downwardly extending portions 59, 60 of the tubular part 55 of the nose piece 47 are joined by an integral bottom portion 61 and the shape of this lower part of the nose tube 55 may be varied provided that its external surfaces should be gradually curved and sufficient space should be provided inside for the sliding member 46 which may be of substantially complementary shape to the interior of the tubular portion 55.

The nose portion 62 of the saddle top 63 in this embodiment is provided with a tubular socket 64 premolded and preformed in the saddle top 63 and adapted to fit over the nose piece and to extend rearwardly not only above but below the skirt or tubular portion 55 of the nose piece to such an extent that there is no possibility of the saddle top coming off the nose piece. In such case I may dispense entirely with rivets or other fastening devices for securing the saddle top to the nose piece, and by means of the present construction with the wire portions 30, 31 slidably engaging in the tubular portion 55 of the nose piece by which they are guided, a smaller threaded member 46 may be provided and the relatively long guiding surfaces in the direction of the sliding movement eliminates any possibility of twisting or tipping upwardly of the nose of the saddle which is one of the disadvantages of the devices of the prior art.

By means of the socketed nose end 62 of the saddle top 63, the strain which is placed on this end of the saddle top is more uniformly applied to tension of all the parts of the saddle top and the tendency toward the tipping up of the nose piece by tension which is applied through the usual rivets of the prior art, is also substantially eliminated. The nose piece may be made lighter and smaller and consequently a greater amount of sponge rubber can be used at this point, which is the point of greatest danger of injury to the rider.

It will thus be observed that I have invented an improved saddle top construction which may be provided with such resilient characteristics in a lateral direction that it is adapted immediately to conform to the anatomy of the rider, but the resilient characteristics of my saddle top are also such that it will only stretch a predetermined amount in the direction of the length of the saddle and it will never become so long that it must be replaced because the sag cannot be taken up. The present saddle top may be made more comfortable than the devices of the prior art due to the provision of the base which has a sufficient tensile strength in the proper direction and which is adapted to give and bend to absorb the shocks which would otherwise be transmitted to the rider and the present saddle top is adapted to be secured in a more durable manner to the suspension saddle frame.

The present device may be manufactured at a low cost and may involve less labor in its assembly since it may be attached to the suspension saddle frame without the use of rivets and there is no danger of tearing loose at localized points of securement such as are provided by the rivets of the prior art. In the present suspension saddle the saddle top may be secured to the saddle frame over a wide area of contact so that the strains are not localized but are uniformly distributed and there is no tendency to form stress ridges in the saddle top as in the devices of the prior art.

The tendencies of the prior art devices toward tipping up of the nose piece are eliminated and the present saddle top may be provided with sponge rubber or sponge rubber padding so as to reduce the danger of injury to the rider and to increase the comfort to such an extent that the new or unaccustomed rider may ride for a longer period of time without appreciable discomfort.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a saddle top for suspension saddles for bicycles, a saddle top member formed of a base fabric of woven cords, the weft and warp threads extending diagonally to the major axis of the saddle top which extends from the front toward the rear, said cords being loosely woven and being embedded in a layer of resilient rubber cured on said cords, whereby the saddle top may conform to the body of the rider more readily in its cross-sectional shape on a plane taken at right angles to the said axis and its stretch in the direction of said axis may be limited to prevent sagging on a saddle frame of limited size, said saddle top having its nose formed with an elongated backwardly open and forwardly closed tubular vulcanized socket and a suspension saddle frame corresponding substantially in its external shape to the saddle top, said suspension saddle frame being secured to said saddle top at its nose end by extending into the socket of said saddle top.

2. In a saddle top for suspension saddles for bicycles, a saddle top member formed of a base fabric of woven cords, the weft and warp threads extending diagonally to the major axis of the saddle top which extends from the front toward the rear, said cords being loosely woven and being embedded in a layer of resilient rubber cured on said cords, whereby the saddle top may conform to the body of the rider more readily in its cross-sectional shape on a plane taken at right angles to the said axis and its stretch in the direction of said axis may be limited to prevent sagging on a saddle frame of limited size, said saddle top having its nose formed with an elongated backwardly open and forwardly closed tubular vulcanized socket and a suspension saddle frame corresponding substantially in its external shape to the saddle top, said suspension saddle frame being secured to said saddle top at its nose end by extending into the socket of said saddle top, and at its rear end by having a portion of the saddle top folded over a portion of the frame said portion being vulcanized to the main portion of the saddle top.

3. A suspension saddle comprising a resilient frame having parallel portions for securement to a saddle post mast and having a transversely extending rear portion and a nose piece, and a saddle top carried by said frame, said saddle top having a base fabric of weft and warp threads extending at right angles to each other, said weft and warp threads extending diagonally to the axis of the saddle top which axis extends from the nose to substantially the center of the transverse rear frame member, said base fabric having its cords loosely woven and secured together by a resilient vulcanized material whereby the tendency to stretch in said base fabric is definitely predetermined, said saddle top having its nose formed with an elongated backwardly open and forwardly closed tubular, vulcanized socket and said saddle top being formed at its rear end with a strip bent into a loop extending about said transverse rear frame portion, said strip having its end portion vulcanized to the lower surface of said saddle top.

4. A suspension saddle comprising a resilient frame having parallel portions for securement to a saddle post mast and having a transversely extending rear portion and a nose piece, and a saddle top carried by said frame, said saddle top having a base fabric of weft and warp threads extending at right angles to each other, said weft and warp threads extending diagonally to the axis of the saddle top which axis extends from the nose to substantially the center of the transverse rear frame member, said base fabric having its cords loosely woven and secured together by a resilient vulcanized material whereby the tendency to stretch in said base fabric is definitely predetermined, said saddle top having its nose formed with an elongated backwardly open and forwardly closed tubular, vulcanized socket and said socket being provided with walls extending above and below and on the sides of said nose piece for uniformly distributing the strains from the nose piece to the saddle top.

5. A suspension saddle comprising a resilient metal wire frame comprising a pair of legs extending parallel to each other at the nose of said saddle, said legs being bent downwardly and diverging to a central portion of the frame and having substantially parallel portions at the central part of said frame, and said legs thereafter extending diagonally outward and upward from said central portions and being joined by a rear frame portion, said parallel wire portions at the nose of said frame being secured to a cross-head having a threaded bore, a threaded member in said bore having its end formed with a rounded point, a tubular metal member open at its rear end and closed at its front end, slidably mounted on said cross-head and engaged by said threaded member, and a saddle top comprising a loosely woven fabric having substantially non extensible cords with its warp and weft, said fabric being covered with a vulcanized coating of vulcanizable material, and said top being looped about the rear frame portion of said frame and vulcanized in place, and having an elongated tubular socket closed at its front end, carried by the nose of said saddle top for receiving the tubular member on said frame.

6. A suspension saddle comprising a resilient metal wire frame comprising a pair of legs extending parallel to each other at the nose of said saddle, said legs being bent downwardly and diverging to a central portion of the frame and having substantially parallel portions at the central part of said frame, and said legs thereafter extending diagonally outward and upward from said central portions and being joined by a rear frame portion, said parallel wire portions at the nose of said frame being secured to a cross-head having a threaded bore, a threaded member in said bore having its end formed with a rounded point, a tubular metal member open at its rear end and closed at its front end, slidably mounted on said cross-head and engaged by said threaded member, and a saddle top comprising a loosely woven fabric having substantially nonextensible cords for its warp and weft, said fabric being covered with a vulcanized coating of vulcanizable material, and said top being looped about the rear frame portion of said frame and vulcanized in place, and having an elongated tubular socket closed at its front end, carried by the nose of said saddle top for receiving the tubular member on said frame, the said saddle top being provided with an auxiliary layer of sponge rubber on its upper side and with a finishing layer of smooth rubber exterior to said sponge rubber.

FRANK W. SCHWINN.